May 15, 1956 F. W. BRODERICK 2,745,543
DISPLAY BOXES
Filed Aug. 29, 1952 6 Sheets-Sheet 1

INVENTOR
Frank W. Broderick,
BY Karl W. Flocks
ATTORNEY

May 15, 1956 F. W. BRODERICK 2,745,543
DISPLAY BOXES
Filed Aug. 29, 1952 6 Sheets-Sheet 2

INVENTOR
Frank W. Broderick,

BY Karl W. Flocks
ATTORNEY

May 15, 1956 F. W. BRODERICK 2,745,543
DISPLAY BOXES
Filed Aug. 29, 1952 6 Sheets-Sheet 5

INVENTOR
Frank W. Broderick,
BY
Karl W. Flocks
ATTORNEY

United States Patent Office
2,745,543
Patented May 15, 1956

2,745,543

DISPLAY BOXES

Frank W. Broderick, Summit, N. J., assignor to Brown & Bailey Company, Philadelphia, Pa., a corporation of Pennsylvania Application August 29, 1952, Serial No. 307,097

1 Claim. (Cl. 206—45)

The present invention relates to display boxes. More particularly, the present invention relates to display boxes that are compact for shipping and can be readily converted into two-tier display units.

Prior to the instant invention, it has been the usual custom to ship merchandise in boxes which were designed to withstand the rigors of handling in transportation. However, these boxes were not adaptable for display purposes, which resulted in considerable waste of time in setting up displays and in the use of an additional display container. Attempts have been made heretofore to employ combination shipping and display boxes, but the difficulties arising from assembling these boxes have prohibited their use. Moreover, the heretofore known combination boxes were not adequately constructed and were frequently damaged in shipping. Furthermore, these boxes were neither suitable nor convenient for displaying large quantities of merchandise advantageously and consequently were undesirable for general display purposes.

It is one of the objects of the present invention to provide a display box that can be quickly assembled for shipping purposes and easily adjusted for displaying purposes.

Another object of the present invention is to provide a display box having two tiers which are arranged in a compact unit.

Still another object of the present invention is to provide a two-tier display box having a built-in locking device.

A still further object of the present invention is to provide a display box in which all the visible surfaces inside and out can be printed simultaneously.

Another object of the present invention is to provide a two-tier display box in which each tier is formed independently but is arranged to interlock with one another.

Other objects and the nature and advantages of the instant invention will be apparent from the following description taken in conjunction with the accompanying drawings, wherein.

The display boxes to be described hereinafter are shown and described as having specific shapes and sizes. However, it is understood that the principles of construction of these display boxes may be applied to containers of various shapes and sizes.

Referring to the drawings, and particularly Figs. 1–5, one form of the present invention is illustrated comprising an outer container 10 and an inner container 12. The outer container 10 includes a front and a rear compartment that are separated by a partition 14 formed as an integral part of the outer container 10. The rear compartment of the outer container 10 is adapted to receive the inner container 12 which slides vertically therein and forms with the front compartment the two-tier display unit.

Figures 1, 2, 3:
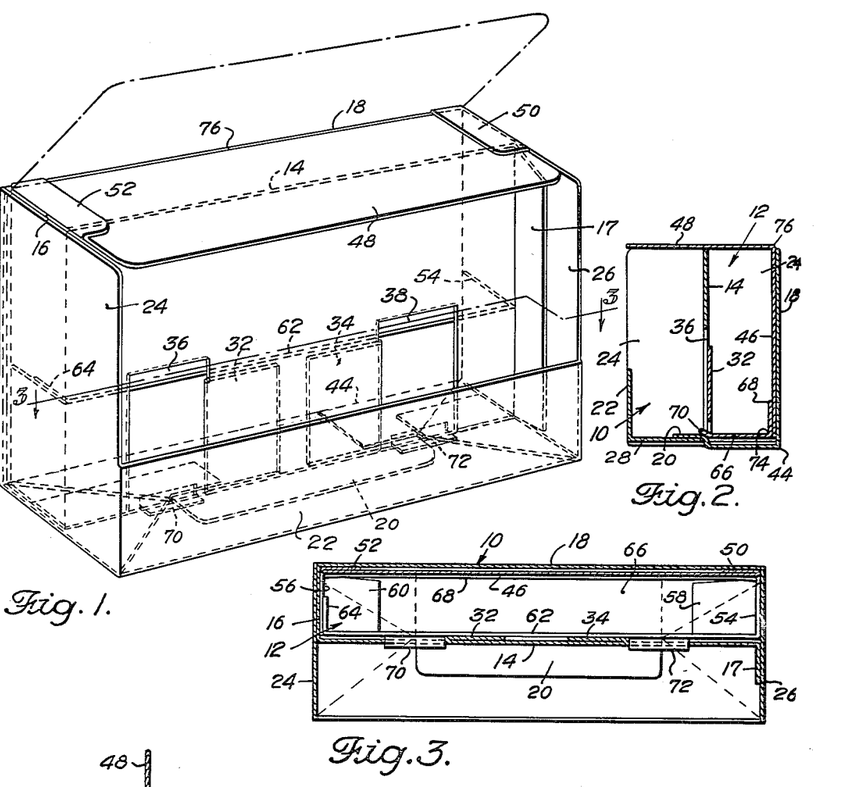
Fig. 1 is a perspective view of one form of the present invention showing the display box in the closed position.
Fig. 2 is a vertical sectional view of the display box illustrated in Fig. 1.
Fig. 3 is a view taken along the line 3—3 of Fig. 1.
Figure 4:
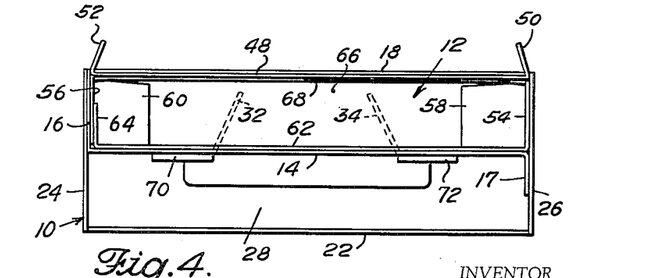
Fig. 4 is a plan view of the display box shown in Fig. 1 in the open or display position, with the locking flaps illustrated in dotted lines.
Figures 21, 22, 23, 24, 25:
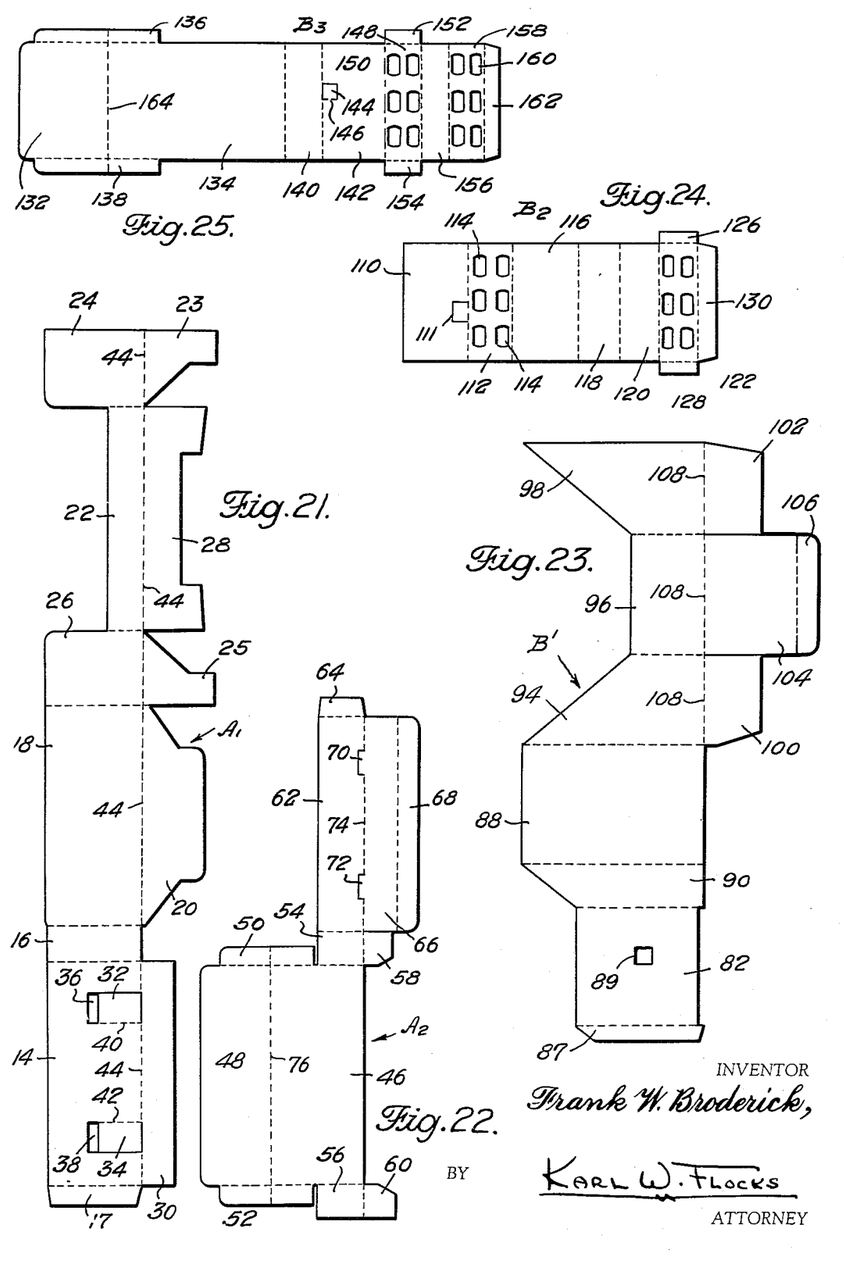
Fig. 21 is a plan view of a blank from which the outer container of the box shown in Figs. 1 through 5 is constructed.
Fig. 22 is a plan view of the blank from which the inner container inserted in the box illustrated in Figs. 1 through 5 is constructed.
Fig. 23 is a plan view of the blank from which the modified form of the outer container illustrated in Figs. 6 through 10 is constructed.
Fig. 24 is a plan view of a blank from which the intermediate article holder disposed in the outer container, shown in Figs. 6 through 10, is constructed.
Fig. 25 is a plan view of the blank from which the inner container illustrated in Figs. 6 through 10 is constructed.

The outer container 10 is constructed from a blank indicated generally at A₁ in Fig. 21, and comprises the partition 14 which is joined by a partition side wall 16 and a partition flap 17 which are adapted to secure the partition 14 in place. Joined to the partition side wall 16 is a rear wall 18 which is folded parallel to the partition 14 and has integrally formed therewith, and folded perpendicular thereto, a bottom closure flap member 20. An open front wall 22, parallel to the partition 14 and rear wall 18, is formed between side walls 24, 26, the side wall 26 being integrally connected to the rear wall 18 and folded perpendicular thereto. Joined to the side walls 24, 26, respectively, are side flap members 23, 25 which aid in holding the container in place. A bottom section 28 is directly connected to the front wall 22 and is provided with a cutout portion (see Fig. 21) for receiving the closure flap member 20. The partition 14 has joined thereto a partition bottom section 30 which fits over the closure flap member 20 while hingedly formed in the partition 14 are locking flaps 32, 34. The locking flaps 32, 34 are cut out from the partition 14, thereby exposing slots 36, 38, and are adapted to be folded along the creased lines 40, 42 toward the back side of the partition 14, as shown in Figs. 3 and 4. The locking flaps 32, 34 are formed somewhat shorter than the slots 36, 38 cut out from the partition 14, and thereby define therewith open portions, the purpose of which will be hereinafter described.

The different sections of the outer container 10 referred to above are shown in Fig. 21 divided by creased fold lines represented by dotted lines. The folding operation forming the containers described herein is accomplished by high speed automatic folding box machniery which folds the container sections along the creased fold lines, thereby effecting the finished containers. In the folding operation which forms the inner container 10, the partition 14, side portion 16, back wall 18, front wall 22, and sides 24, 26 are all folded along creased fold line 44, thereby establishing the basis for the bottom sections. Subsequent folding along the remaining creased fold lines brings the side flaps 23, 25 over the closure flap 20 with the bottom section 28 disposed therebetween (see Fig. 2). Partition bottom section 30 fits over the side flaps 23, 24 and the partition 14 is secured in place between the front and rear walls by gluing side partition wall 16 to side 24 and partition flap 17 to side wall 26. The folding operation is completed by tucking the closure flap member 20 in the cut-out portion provided in the bottom section 28.

Figure 5:
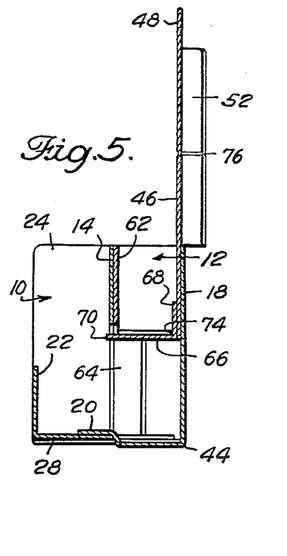
Fig. 5 is a transverse sectional view of Fig. 4, showing the box in the open or display position.

The inner container 12, which is adapted to be received in the rear compartment of the outer container 10, is indicated generally at $A_2$ in Fig. 22 and includes a back wall 46. Joined along the upper end of the back wall 46 is a top section 48 and joined to both the back wall 46 and the top section 48 and extending along a portion of the sides thereof is a pair of flaps 50, 52. Independent from the flaps 50, 52, but joined to the back wall 46 at opposite ends thereof, are sides 54, 56 which include tabs 58, 60 joined respectively thereto. Connected to the side 54 is a front wall 62 which is somewhat shorter than the back wall 46. Joined to the other side of the front wall 62 is a side tab 64 adapted to be secured to side 56, while a bottom section 66 including a bottom flap 68 is joined to the front wall 62 and formed perpendicular thereto. The bottom section 66 is adapted to receive therein the tabs 58, 60 and in addition has integrally formed therewith tongues 70, 72, which are cut out from the front wall 62. As shown in Fig. 5, when the bottom section 66 is folded along creased fold line 74 to a position perpendicular to the front wall 62, the tongues 70, 72 extend through the openings in the front wall 62 formed by the folding bottom section 66. In forming the inner container 12, the tabs 58, 60 are folded to fit on top of the bottom section 66, while the bottom flap 68 fits flush against the inside of the back wall 46. The side flap 64 is fitted on the inside of the side 56 and is glued thereto, thereby securing the inner container 12 in the folded position.

The inner and outer containers are arranged in the assembled position by inserting the inner container into the back compartment of the outer container 12. In order to carry out this assembly, the locking flaps 32, 34 are turned outwardly and held flush against the back of partition 14, as seen in Fig. 3. With the flaps 50, 52 tucked back against the back wall 46 and top section 48, the inner container is lowered into the rear compartment of the outer container 10 until the tongues 70, 72 reach the lowermost portion of slots 40, 42, which were formed when the locking flaps 32, 34 were turned outwardly. Merchandise can then be inserted into the front compartment of the outer container 10 and into the inner container 12. For shipping purposes, the top section 48 is folded along creased fold line 76 and covers the top of the unit, as seen in Figs. 1 and 2. The display box in this position forms a compact container and can be inserted into a conventional box for shipping. When it is desired to display the merchandise, which has been inserted into the box, the top section 48 is folded back and pulled upwardly. This moves the inner container 12 upwardly, the tongues 70, 72 riding in the slots 36, 38. When the inner container 12 has moved upwardly a sufficient amount to uncover the locking flaps 32, 34, the locking flaps are released from their folded position and move outwardly into the rear compartment to a stop position, as shown in dotted lines in Fig. 4. Referring to Fig. 5, the container 12 is shown in the up or display position. The tongues 70, 72 are disposed in the slots 36, 38 and act as stops to prevent further movement in an upward direction. The bottom section 66 of container 12 rests on the locking flaps 32, 34 and the flaps 50, 52, which have cleared the back wall 18, have moved outwardly to act as additional stops for the inner container 12. The flaps 50, 52, in addition, prevent the top section 48 from folding along creased fold line 76. The top section 48 and back wall 46 then present a large surface area that can be used for advertising purposes (Fig. 5). It is apparent that this two-tier arrangement is particularly suited to displaying merchandise to its fullest advantage. The lower front wall 22 gives ready access to the lower tier while the shortened front wall 62 affords convenient access to the second tier or inner container 12.

Referring to Figs. 6-10 and 23-25, a modified form of the present invention is disclosed comprising a display box into which toothbrushes sealed in appropriate containers are adapted to be displayed. It is understood that the principles of this modification are not restricted to the displaying of toothbrushes but can be applied for displaying articles of various shapes and sizes.

The display box illustrated in Figs. 6-10 comprises an outer container 80 which is divided into a front and a rear compartment by a partition 82. Positioned in the front compartment of the outer container 80 is an intermediate or holding container 84, which is adapted to have toothbrush containers 85 inserted therein, and comprises the lower tier of the two-tier display unit. Located in the rear compartment of the outer container 80 is a vertically movable inner container 86 which is adapted to receive the toothbrush containers 85 therein and thereby comprises the upper tier of the display unit.

Figures 7, 8:
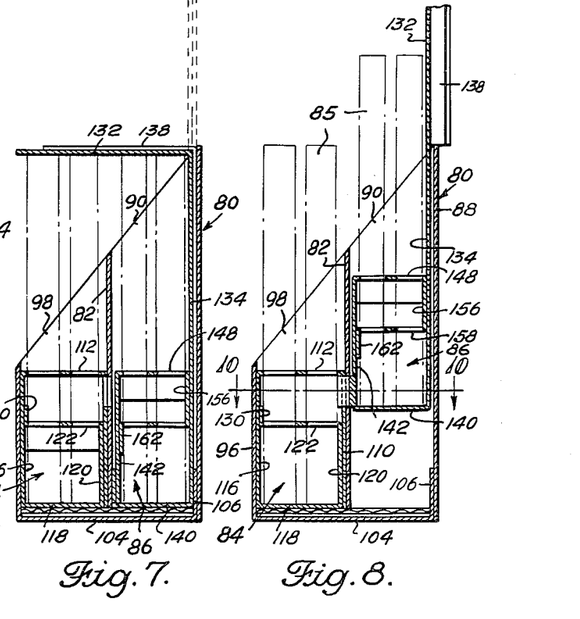
Fig. 7 is a vertical sectional view of the display box illustrated in Fig. 6.
Fig. 8 is a vertical sectional view of the display box shown in Fig. 7 with the elements in display position.
Figure 9:
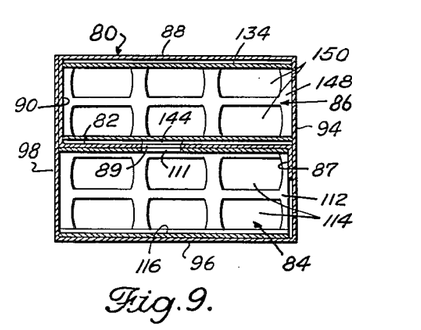
Fig. 9 is a view taken along the line 9—9 of Fig. 6.

The outer container 80 is formed from a blank indicated generally at $B_1$ in Fig. 23 and includes a rectangularly shaped rear wall 88. The rear wall 88 has joined perpendicularly thereto a partition side wall 90 which slopes from the upper end thereof to the shorter partition 82. The partition 82 is positioned parallel to the rear wall 88 and has joined thereto a securing flap 87. Formed in the partition 82 is an opening 89, the purpose of which will hereinafter be described. Joined to the other side of the rear wall 88 is a side wall 94 which slopes from the top thereof to a lower front wall 96 formed parallel with the rear wall 88 and the partition 82. A side wall 98 perpendicular to the rear wall 88 and front wall 96 joins the other side of front wall 96 and corresponds in size to side wall 94. Connected to side walls 94, 98 and adapted to be folded perpendicular thereto are flaps 100, 102. In their folded position, the flaps 100, 102 comprise bottom members and are engaged by a bottom portion 104 which is connected to the front wall 96 and formed perpendicular thereto. The bottom portion 104 includes a closure flap 106 which is adapted to be tucked in between the flaps 100, 102 and the rear wall 88, thereby securing the bottom in place. In folding blank B1 to form the outer container 80, the front and side walls are folded along creased fold line 108. The partition 82 is folded into position intermediate the rear and front walls 88, 96 parallel therewith and forms thereby the front and rear compartments. The bottom portion 104 folds over the flaps 100, 102 and the closure flap fits between the rear wall 88 and flaps 100, 102 to secure the bottom in place. A cardboard member 103 is inserted on the bottom of the container 80 and thereby reinforces the container. The blank B1 is secured in the folded position by gluing the side wall 98 to the outside of partition side wall 90 and securing flap 87 to the inside of side wall 94. Referring to Figs 7 and 8, it is apparent that the sloping side walls 94, 98 provide a two-tier unit that advantageously displays the merchandise in both the front and rear compartments.

Enclosed within the front or shorter compartment of outer container 80 is the intermediate or holding container 84 which is indicated generally at B2 in Fig. 24 in blank form. The holding container 84 includes a rear wall 110 which fits against the front side of the partition 82 and which has an opening 111 formed therein corresponding in position to the opening 89. Joined to the rear wall 110 and perpendicular thereto is a top section 112 which has formed therein openings 114 for receiving the toothbrush containers 85. Folded over from the top section 112 is a front wall 116 which, in turn, folds into a bottom section 118 extending parallel with the bottom portion 104 of the outer container 80. The bottom section 118 is joined to a reinforcing member 120 which folds into a partition 122. The partition 122 is located parallel to top section 112 and includes openings 124 similar to openings 114 and, as seen in Figs. 7 and 8, are aligned therewith. Flaps 126, 128, 130, joined to the partition 122, complete the holding container blank. In folding the holding container 84, the top section 112 and partition 122 are formed parallel with their openings aligned. The flap 130 is glued to the inside of front wall 116 and reinforcing member 120 is glued to rear wall 110, thereby securing the container in place. The holding container 84 is placed in position in the front compartment of the outer container 80 by folding the flaps 126, 128 downwardly and then inserting the container into the front compartment. As shown in Figs. 7 and 8, the holding container 84 fits below the upper edge of the outer container front wall 22 with the opening 111 aligned with opening 89 formed in the outer container partitioned 82.

The inner movable container 86, which is adapted to move vertically in the rear compartment of the outer container, is illustrated in Fig. 25 in blank form and indicated generally at B3. The inner container 86, which forms the second tier of the two-tier display, comprises a top section 132 which is joined to an elongated rear wall 134. Joined to both the top section 132 and rear wall 134, and extending along a portion of the sides of both, are stop flaps 136, 138. A narrow bottom portion 140 is joined to the rear wall 134 and is positioned perpendicular thereto. A front wall is joined to the bottom portion 140 and is disposed perpendicular thereto and in parallel relation to the rear wall 134. Formed in the front wall 142 is a locking flap 144 which is adapted to be hingedly folded along creased fold line 146. A top section 148 parallel to bottom portion 140 and having openings 150 for receiving the toothbrush containers 85 is joined to the front wall 142 and includes tabs 152, 154. A reinforcing wall 156 joins in parallel relation the top section 148 to a partition 158 which has openings 160 formed therein adapted to be aligned with openings 150. A fastening flap 162, joined to partition 158 and secured to front wall 142 completes the inner container assembly.

Figure 6:
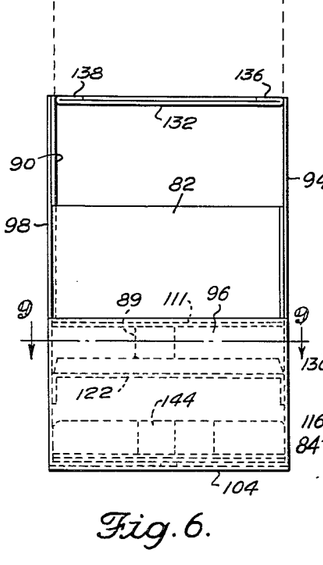
Fig. 6 is a front elevational view of a modified form of the present invention with the display box shown in the closed position.
Figure 10:
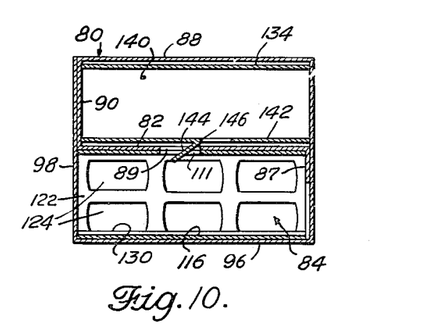
Fig. 10 is a view taken along the line 10—10 of Fig. 8.
Figure 11:
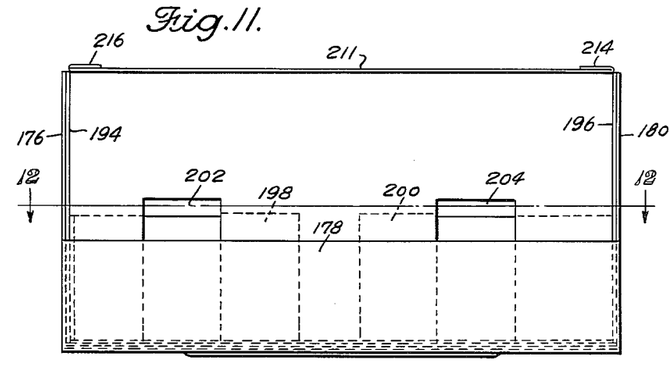
Fig. 11 is a front elevational view of another modified form of the present invention showing the display box in the closed position.

To insert the inner container 86 into the outer container 80, locking flap 144 is folded back along creased fold line 146 until it is flush against the front side of the front wall 142. As shown in Fig. 10, the locking flap 144 in the folded position is adapted to align with openings 89 and 111 when the inner container 86 is raised upwardly. The flaps 152, 154 are then depressed and stop flaps 136, 138 turned inwardly and the inner container 86 is inserted into the rear compartment of the outer container 80, taking the position as shown in Figs. 6 and 7.

The toothbrush containers 85, or other articles to be displayed, are inserted through the openings 114, 124, 150 and 160, and if it is desired to ship the unit, the top section 132 is folded along a creased fold line 164 in the position shown in Fig. 7. The entire unit can then be inserted in a suitable shipping box. To display the merchandise, the unit is removed from the shipping box and the top section 132 pulled backwardly and upwardly. This movement causes the inner container 86 to be moved in an upward direction in the rear compartment of the outer container 80. When the inner container 86 reaches the position shown in Fig. 8, the locking flap 144 becomes aligned with openings 86 and 111 and projects therethrough, thereby locking the inner container in the up position. Stop flaps 136, 138 at this position extend outwardly, resting on the top of the outer container rear wall 88, and thereby aid in locking the inner container in position. The stop flaps 136, 138 also prevent the top section from folding along fold line 164 when the inner container 86 is in the display position thereby providing a continuous surface which is defined by the top section 132 and rear wall 134 and which can be utilized for printed advertising matter. It is apparent that the inner container 86 in the up or display position is securely locked in place and will not move until the locking flap 144 and stop flaps 136, 138 are depressed.

Figure 26:
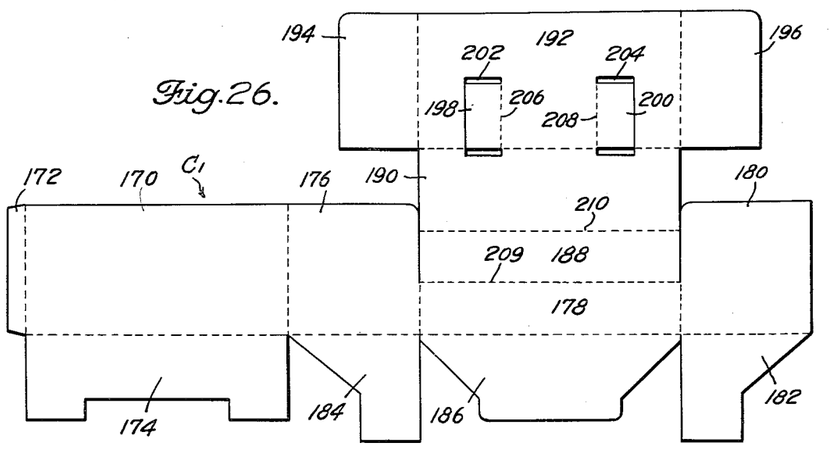
Fig. 26 is a plan view of a blank from which the outer container shown in Figs. 11 to 14 is constructed.

Referring now to Figs. 11 through 14, another modified form of the present invention is disclosed comprising a display box into which articles are adapted to be inserted and displayed. The display box illustrated in Figs. 11 through 14 comprises an outer container 166 which is divided into a front and a rear compartment. As illustrated particularly in Fig. 13, the front compartment is larger than the rear compartment and is thereby adapted to receive a double layer of articles. An inner container 168, receiving a single layer of articles, is disposed in the rear compartment of the outer container 166 and is adapted to slide vertically therein. The outer container 166 is formed from a blank indicated generally at C1 in Fig. 26 and includes a rectangularly shaped rear wall 170. Joined to the rear wall 170 is a securing tab 172 and a bottom section 174 which is positioned perpendicular to the rear wall 170 and which is formed with a cut-out portion along the outer side thereof. Positioned perpendicular to the rear wall 170 on the side opposite the tab 172 is a side wall 176 which folds into a shortened front wall 178 positioned parallel to the rear wall 170. A second side wall 180 is joined to the front wall 178 in parallel relation to side wall 176 and has connected thereto a flap 182. A corresponding flap 184 is connected to side wall 176, the flaps 182, 184 forming part of the bottom structure of the container 166. Connected to the front wall 178 perpendicularly thereto is a closure member 186 which fits over the flaps 184, 186 and into the cut-out portion provided in the bottom section 174. Joined to the front wall 178 and positioned between the side walls 176 and 180, but not connected thereto, is a portion 188 which is an extension of the front wall 178 and which fits flush thereagainst. A bottom member 190 extends from the portion 188 and is disposed over the bottom section 174 in face-to-face relation therewith. Joined to the bottom member and perpendicular thereto is a partition 192 which includes partition flaps 194 and 196. Formed in the partition 192 are a pair of locking flaps 198 and 200 which, as shown in Fig. 26, are cut out of sections 202, 204. The sections 202, 204 which are cut out from the partition 192 extend somewhat above the locking flaps 198 and 200 and into a portion of the bottom member 190 and thereby form open portions at each end of the locking flaps. The locking flaps 198, 200 are adapted to be folded along lines 206, 208, the purpose of which will be hereinafter described.

Figures 12, 13, 14:
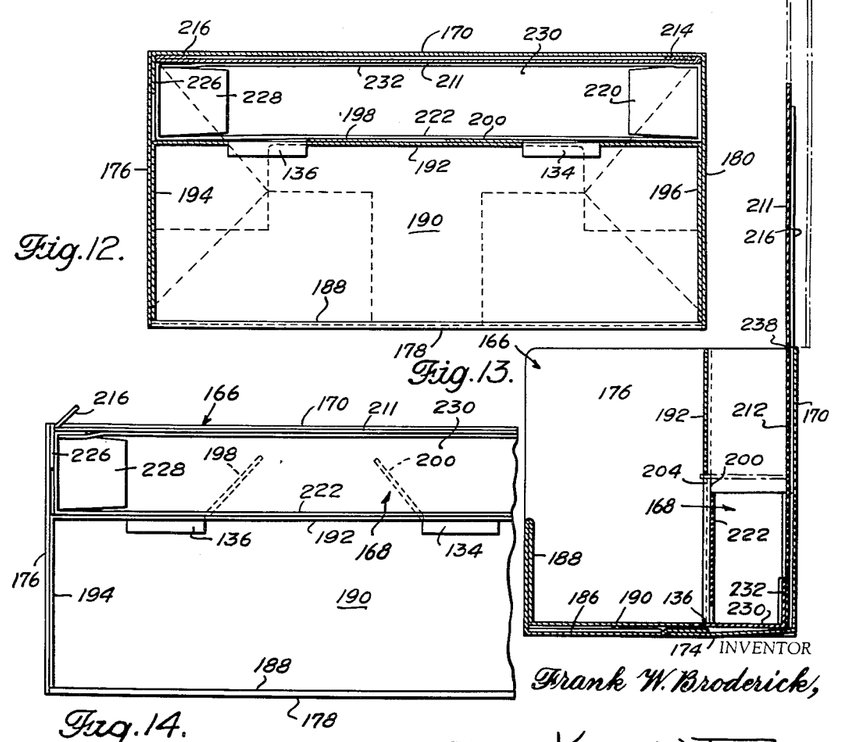
Fig. 12 is a view taken along the line 12—12 of Fig. 11.
Fig. 13 is a vertical sectional view of the display box illustrated in Fig. 11, the display position shown in dotted lines.
Fig. 14 is a partial plan view of the display box illustrated in Fig. 12, the box being shown in the display position with the locking flaps indicated in dotted lines.
Figure 15:
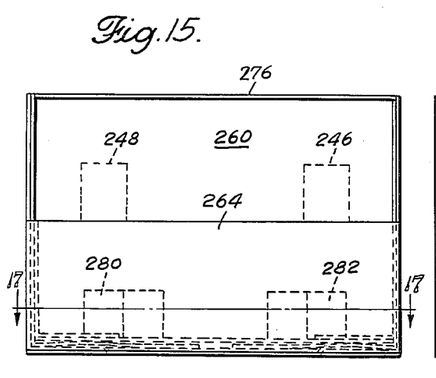
Fig. 15 is a front elevational view of still another modified form of the present invention with the display box shown in the closed position.
Figure 16:
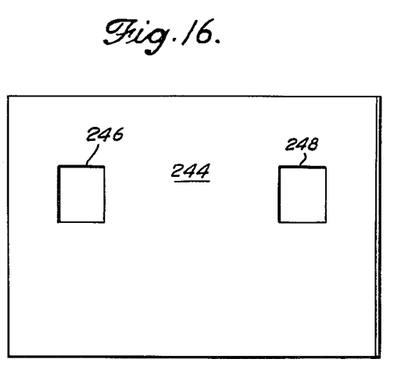
Fig. 16 is a rear elevational view of the display box shown in Fig. 15.

In forming the outer container 166, the individual sections referred to above are folded along the creased folding lines shown in dotted lines in Fig. 26. The present modification is somewhat different from the boxes described hereinabove in that the partition 192 is folded in place by folding the portion 188 along line 209 until it is flush with the front wall 178 and then folding bottom member 190 perpendicular thereto along line 210. It is apparent then that the partition section is formed from a single folded piece extending from the partition 192 to the closure member 186. The side walls 176 and 180 are folded in place along the appropriately creased lines and enclose the partition section, as shown in Figs. 12 and 14. The back wall 170 is folded in place to form with the partition 192 the rear compartment and the tab 172 is glued to the side wall 180, thereby securing the sections in place. The folding operation is completed by tucking in the flaps 182, 184 beneath the bottom member 190 and then tucking in the closure flap 168 in the cut-out section provided in the bottom section 174.

Figure 27:
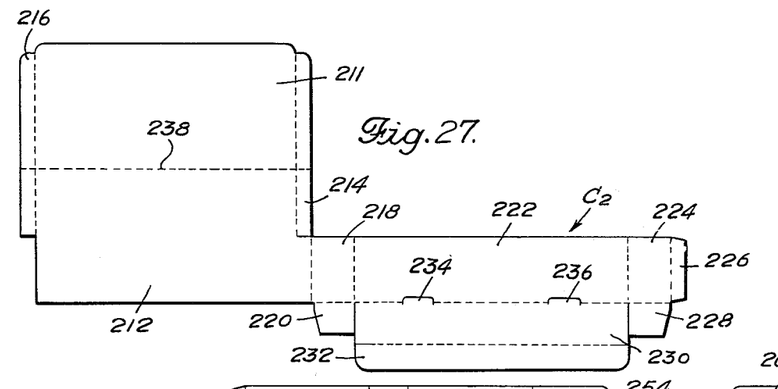
Fig. 27 is a plan view of the blank from which the inner container inserted in the outer container illustrated in Figs. 11 to 14 is constructed.

The inner container 168, which is adapted to slide in the rear compartment of the outer container 166, is formed from a blank generally indicated at $C_2$ in Fig. 27, and includes a top section 211. Connected to the top section 211 is a back wall 212 and joined to the back wall 212 and the top section 211 along a portion of the sides thereof are stop flaps 214 and 216. Connected to the lower portion of the back wall 212 and perpendicular thereto is a side wall 218 which includes a flap 220. Joined to the side wall 218 is a shortened front wall 222 which is positioned parallel to the back wall 212. Formed parallel with the side wall 218 and joined to the front wall 222 is a second side wall 224 which has formed thereon a tab 226 and a flap 228. Connected to the front wall 222 and positioned perpendicular thereto is a bottom section 230 which includes a closure flap 232 adapted to fit behind the back wall 212. Cut out from the front wall 222 are tongues 234, 236. With the inner container 168 in the folded and assembled position as shown in Fig. 13, the tongues 234, 236 extend through the cut-out portions in the rear wall 222.

In folding the inner container 168 along the creased folding lines, indicated as dotted lines in Fig. 27, the flaps 220 and 228 are positioned on the bottom section 230. The closure flap 232 is inserted on the inside of the back of the rear wall 212 and the inner container secured in the folded position by gluing tab 226 to the rear wall 212.

The inner and outer containers are arranged in assembled position by inserting the inner container 168 into the rear compartment of the outer container 166. This is accomplished by folding the locking flaps 198 and 200 backwardly until they are flush against the rear of the partition 192. With the stop flaps 214, 216 folded flush against the rear of the top section 211 and rear wall 212, the inner container 168 is inserted into the rear compartment of the outer container 166 until the tongues 234, 236 rest at the lowermost portion of slots 202, 204. This position is shown in full lines in Fig. 13. The articles to be displayed are then inserted into the front compartment of the outer container 166 and into the inner container 168 with twice the amount of articles being received by the front compartment than the inner container. The top section 211 is folded on the creased folding line 238 and covers the box which can then be inserted into a suitable shipping box.

When it is desired to display the articles in the display box, the top section 211 is folded back and pulled upwardly. This moves the inner container 168 upwardly with the tongues 234, 236 moving in the slots 202, 204. When the inner container 168 reaches the position shown in dotted lines in Fig. 13, the locking flaps 198 and 200 are released from their depressed position and move outwardly into the rear compartment of the outer container 166, as shown in dotted lines in Fig. 14. This prevents the inner container 168 from moving downwardly and the locking flaps 198, 200 thereby serve as a seat for the inner container 168. The tongues 234, 236 in the up position of the inner container 168 are disposed in the upper portion of the slots 202, 204 as shown in Fig. 13 and thereby serve as stops for further upward movement of the inner container 168. With the inner container 168 in the up or display position, the stop flaps 214 and 216 are free to move outwardly and thereby serve as additional stops against downward movement of the inner container. It is apparent that the stop flaps 214 and 216 also prevent the top section 210 from folding on the creased folding line 238, thereby providing a large panel comprising top section 211 and rear wall 212 which can be utilized for printed advertising matter. It is furthermore apparent that the display box in the position shown in Fig. 13 presents a two-tier arrangement that is particularly adaptable for displaying large quantities of articles.

Referring now to Figs. 15 through 20, still another modification of the present invention is shown in which an outer container 240, which includes a front and a rear compartment, has slidably disposed in the rear compartment thereof an inner container 242. The outer container 240, which is shown in blank form in Fig. 28, and indicated generally at $D_1$, includes a rear wall 244 which has formed therein openings 246 and 248. Connected to one side of the rear wall 244 and positioned perpendicular therewith is a partition side wall 250 which has secured thereto a bottom flap 252. Parallel with partition side wall 250 and joined to the other side of the rear wall 244 is a side wall 254 which has joined thereto a bottom flap 256. Folded perpendicular to the rear wall 244 is a bottom closure member 258 which is formed with rounded tabs and which forms part of the bottom section of the outer container 240. A partition 260 is secured to the partition side wall 250 and is formed parallel with the rear wall in the folded position. A securing flap 262 is joined to the partition 260 and is adapted to be secured to the side wall 254 in the folded position. Connected to the side wall 254 and parallel with the rear wall 244 and partition 260 is a shortened front wall 264. Connected between the rear wall 244 and front wall 264 and folded perpendicular thereto is a second side wall 266 which has attached thereto a flap 268. Folded perpendicular to the front wall 264 is a bottom section 270 which receives the flaps 256, 268 thereon. The bottom section 270 has formed therein slits 272 and 274, which are adapted to receive the rounded tabs of the closure member 258. The folding operation is accomplished by folding the outer container sections along the creased lines indicated in dotted lines in Fig. 28, the rear wall 244, partition 260 and shortened front wall 264 being formed in parallel relation, thereby forming the front and rear compartments. The flaps 256 and 268 are folded between the bottom section 270 and the flap 252 and flap 256. The folding operation is completed by inserting the rounded tabs of closure member 258 into the slits 272, 274 provided in the bottom section 270. Flap 262 is glued to the side wall 254 and the side wall 266 is glued to the partition side wall 250, thereby securing the outer container in assembled position.

Figures 17, 18, 19, 20:
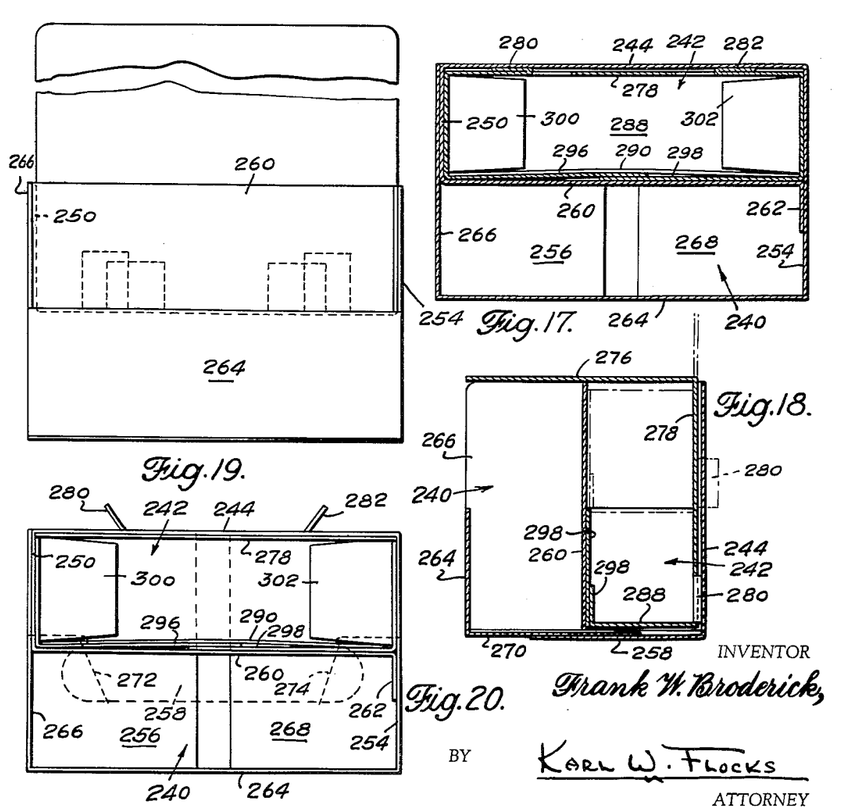
Fig. 17 is a view taken along the line 17—17 of Fig. 16.
Fig. 18 is a vertical sectional view of the display box illustrated in Fig. 15 with the inner container shown in dotted lines locked in the display position.
Fig. 19 is a front elevational view of the box shown in Fig. 15 locked in the display position.
Fig. 20 is a plan view of the box illustrated in Fig. 19 in the display position.
Figures 28, 29:
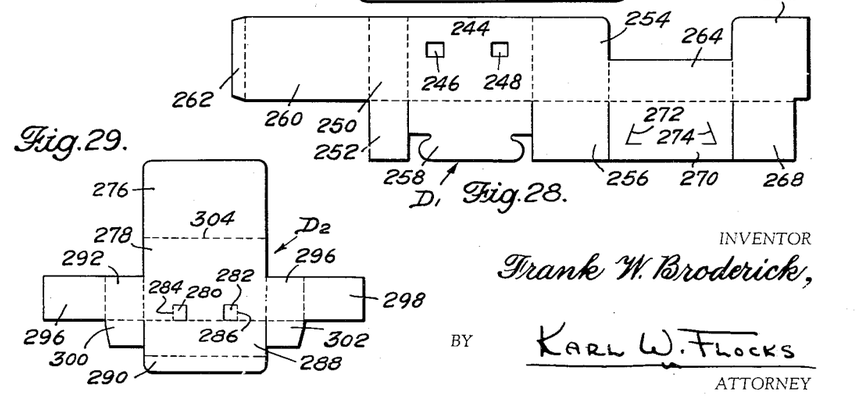
Fig. 28 is a plan view of the blank from which the outer container shown in Figs. 15 to 20 is constructed.
Fig. 29 is a plan view of the blank from which the inner container inserted in the outer container illustrated in Figs. 15 through 20 is constructed.

The inner container 242, which slides in the rear compartment of the outer container, is illustrated in Fig. 29 and generally indicated at $D_2$, and includes a top section 276 which is integrally joined to a rear section 278. Locking flaps 280 and 282, which are formed in the rear section 278 by hingedly cutting out portions therein, are adapted to swing on the creased lines 284 and 286, respectively. Joined to the rear section 278 and folded perpendicularly thereto is a bottom section 288 which has secured thereto a closure flap 290. Formed on either side of the rear section 278 are side members 292 and 294 which are folded perpendicular to the rear section 278 and parallel to each other, as shown in Figs. 17 and 20. Secured to the side members 292, 294, respectively, are front wall members 296, 298 which are formed parallel with the rear section 278 and secured to each other in overlapping relation. Side tabs 300 and 302 are joined to the side members 292, 294, respectively, and fit over the bottom portion 288 in the folded position. The inner container 242 is assembled in the folded position by folding along the creased lines indicated by dotted lines in Fig. 29. The folding operation is completed by tucking in the closure member 290 between the tabs 300 and 302 on the inside of the secured front wall members 296, 298.

In assembling the display box illustrated in Figs. 15 through 20 and 28 and 29, the locking flaps 280 and 282 are folded back along the lines 284, 286 until they are flush with the back of the rear section 278. The inner container 242 is then inserted into the rear compartment of the outer container 240 until the position shown in Fig. 18 is reached. The articles to be displayed are inserted into the front compartment of the outer container 240 and into the inner container 242 which is located in the rear compartment of the outer container 240. If it is desired to place the display box in a shipping box, the top section 276 is folded along the creased line 304, as shown in Fig. 18, in which position the display box can be inserted into a suitable shipping box. When it is desired to display the contents of the display box, the top section 276 is pulled backwardly and upwardly. This moves the inner container 242 upwardly. When the inner container 242 reaches the position shown in dotted lines in Fig. 18, the locking flaps 280, 282 register with the openings 246, 248 and are projected therethrough. This locks the inner container in position with respect to the outer container and further movement is prevented upwardly or downwardly by the locking flaps 280, 282 which project through the openings 246, 248, as shown in Figs. 18 and 20.

It is apparent that the shortened front wall of the outer containers of the display boxes described hereinabove gives ready access to the front compartment thereof and the second tier arrangement of the inner containers affords convenient access to the articles disposed therein. The display boxes described hereinabove in the various modifications not only are adapted to receive large quantities of merchandise, but are particularly adapted for inexpensively and neatly displaying the merchandise disposed therein. The locking flaps which are formed as integral parts of the display box assemblies are adapted to positively lock the inner and outer containers in a two-tier position. This enables the merchandise to be dispensed with a minimum of effort and without disturbing the display arrangement. By forming the inner and outer containers in the blank form, the printed advertising matter on the rear and top sections or on any other section of the blank can be printed simultaneously. The complete display box unit is readily available for shipping, thereby eliminating the necessity of additional shipping and display containers.

It will be obvious to those skilled in the art that various changes may be made without departing from the spirit of the invention and therefore the invention is not limited to what is shown in the drawings and described in the specification but only as indicated in the appended claim.

What is claimed is:

A display box comprising an outer container formed from a one-piece blank, said outer container including a vertical rear wall, a shortened front wall integrally joined to said rear wall by a side wall, side walls connecting said front and rear walls, a partition positioned between and parallel with said front and rear walls and coextensive therewith, vertically hinged locking flaps cut out from said partition adjacent the bottom edge thereof and terminating short of the top edge thereof, said partition defining a front and a rear compartment in said outer container, an inner container formed from a one-piece blank disposed in said rear compartment and adapted to slide vertically therein, a tongue formed integral with the bottom section of said inner container extending outwardly in the plane thereof, a top section formed integral with the back wall of said inner container and adapted when pulled upwardly to raise said inner container in said rear compartment above said locking flaps, said outer container providing an edge portion engageable by the tongue to limit upward movement of the inner container when so raised.

References Cited in the file of this patent
UNITED STATES PATENTS

| | | |
|---|---|---|
| 1,929,615 | Tanner | Oct. 10, 1933 |
| 1,964,294 | Mac Donald | June 26, 1934 |
| 2,021,003 | Einson et al. | Nov. 12, 1935 |
| 2,125,845 | Larkin | Aug. 2, 1938 |
| 2,134,964 | Whitehead | Nov. 1, 1938 |
| 2,340,148 | Silberstein | Jan. 25, 1944 |